US012664764B2

(12) United States Patent
Baur et al.

(10) Patent No.: US 12,664,764 B2
(45) Date of Patent: Jun. 23, 2026

(54) METHODS FOR GENERATING AND MODIFYING SYNTHETIC ON-PERSON SCREENING IMAGES

(71) Applicant: Rohde & Schwarz GmbH & Co. KG, Munich (DE)

(72) Inventors: Christoph Baur, Augsburg (DE); Benedikt Huber, Munich (DE); Georg Schnattinger, Dorfen (DE); Andreas Schiessl, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 247 days.

(21) Appl. No.: 18/519,726

(22) Filed: Nov. 27, 2023

(65) Prior Publication Data

US 2025/0174013 A1     May 29, 2025

(51) Int. Cl.
| | |
|---|---|
| *G06T 11/00* | (2026.01) |
| *G06T 7/70* | (2017.01) |
| *G06V 10/764* | (2022.01) |
| *G06V 10/774* | (2022.01) |
| *G06V 10/82* | (2022.01) |
| *G06V 10/94* | (2022.01) |
| *G06V 20/70* | (2022.01) |

(52) U.S. Cl.
CPC .............. *G06V 10/774* (2022.01); *G06T 7/70* (2017.01); *G06T 11/00* (2013.01); *G06V 10/764* (2022.01); *G06V 10/82* (2022.01); *G06V 10/945* (2022.01); *G06V 20/70* (2022.01); *G06T 2207/20081* (2013.01); *G06T 2207/20084* (2013.01); *G06T 2207/30196* (2013.01); *G06V 2201/05* (2022.01)

(58) Field of Classification Search
None
See application file for complete search history.

(56) References Cited

U.S. PATENT DOCUMENTS

| | | | |
|---|---|---|---|
| 2021/0319363 A1* | 10/2021 | Gillberg | ............... G06V 10/774 |
| 2022/0108509 A1* | 4/2022 | Swaminathan | ...... G06N 3/0475 |

(Continued)

OTHER PUBLICATIONS

Katsuyama, Yutaka et al., "AI-Based W-Band Suspicious Object Detection System for Moving Persons Using Gan: Solutions, Performance Evaluation and Standardization Activities," 2020 ITU Kaleidoscope Academic Conference, IEEE, Dec. 2020.

*Primary Examiner* — Yi Wang
(74) *Attorney, Agent, or Firm* — Studebaker Brackett PLLC

(57) ABSTRACT

The present disclosure includes a method for generating synthetic on-person screening images including providing a database of labeled on-person screening images, wherein a labeling of a respective on-person screening image in the database indicates: the presence of an object in the image, and, in case the object is present, at least one of: a classification, a location, a size, a material and a weight of the object. The method includes training a generative AI model by feeding at least some of the labeled on-person screening images in the database to the generative AI model; receiving an input where the input includes anatomic information of a person, information on a presence or absence of at least one further object, and/or information on a location of the further object relative to the person; and generating at least one synthetic on-person screening image with the generative AI model based on the input.

15 Claims, 16 Drawing Sheets

(56) References Cited

U.S. PATENT DOCUMENTS

2022/0301284 A1* 9/2022 Li .......................... G06V 10/22
2024/0282117 A1* 8/2024 Shrivastava ........ B60W 60/001
2025/0117991 A1* 4/2025 Jefferson ................. G06T 11/60

* cited by examiner

80

81 Providing a first database

82 Providing a second database

83 Training AI model

84 Receiving further synthetic image

85 Modifying the further synthetic image

Algorithm Application

96

New Dataset of high-fidelity synthetic microwave images

95

AI based pattern recognition algorithm

94

Dataset of synthetic microwave images

Algorithm Training

93

AI based pattern recognition algorithm

91

Dataset of synthetic microwave images

92

Dataset of measured microwave images

Perform simulations with a
CAD model and add to scan

Use result as mask to transfer shadowing into real measurement

Shadow cast by object onto human body subtract

Simulate human mesh without object

Simulate human mesh by considering shadowing effects from object

METHODS FOR GENERATING AND MODIFYING SYNTHETIC ON-PERSON SCREENING IMAGES

TECHNICAL FIELD

The present disclosure relates to a method and a system for generating synthetic on-person screening images. The present disclosure further relates to a method for modifying synthetic on-person screening images.

BACKGROUND ART

On-Person Screening (OPS) technology, such as security scanners, leverage a combination of microwave imaging and advanced algorithms to automatically detect concealed on-person threats with high performance. The algorithms can be used for threat detection and to validate the posture of scanned subjects.

Such algorithms are typically trained and validated on example images of subjects with and without concealed objects, together with meta-information on where an object is concealed in the example image, or the current pose of the subject in the image.

As detection requirements change over time and new threats or specific detection use cases emerge, the algorithms are never complete. For continuously developing and validating the algorithm, enormous quantities of OPS data are required. Collecting these data manually is cumbersome, time-consuming and costly. It also poses data privacy challenges. The subsequent annotation process is also time-consuming and costly, and both processes are prone to human error.

When using manual data collections, it is difficult to exactly cover all needs due to non-availability of subjects, objects and the combinatorial complexity of subjects, objects, concealment locations, object orientations and clothing variations. In addition, OPS data for different hardware versions of a scanner and different placements of the scanner (outside or inside a building, inside a container etc.) may be required. Also, images which feature disruptive effects (e.g., speed of a walkthrough in case of a walkthrough scanner, motion blur effects) may be required for training.

It is possible to simulating OPC data by means of physics simulation techniques. However, such simulations are computationally expensive (e.g., up to 7 h per sample). Furthermore, due to the simplicity of today's physical modelling it is often not possible to simulate clothing artifacts or objects properly.

SUMMARY

Thus, there is a need to provide an improved method and an improved system for generating synthetic on-person screening images, which avoid the above-mentioned disadvantages.

This is achieved by the embodiments provided in the enclosed independent claims. Advantageous implementations of the embodiments of the present disclosure are further defined in the dependent claims.

According to a first aspect, the present disclosure relates to a method for generating synthetic on-person screening images. The method comprises the step of: providing a database of labeled on-person screening images, wherein a labeling of a respective on-person screening image in the database indicates: the presence of an object in the on-person screening image, and, in case the object is present, at least one of: a classification of the object, a location of the object, a size of the object, a material of the object and a weight of the object. The method further comprises the steps of: training a generative artificial intelligence (AI) model by feeding at least some of the labeled on-person screening images in the database to the generative AI model; and receiving an input for generating synthetic on-person screening images at an input interface, wherein the input comprises: anatomic information of a person, information on a presence or absence of at least one further object, and/or information on a location of the further object relative to the person. The method further comprises the step of generating at least one synthetic on-person screening image with the generative AI model based on the input.

This provides the advantage that a large amount of realistic on-person screening (OPS) data can be generated, e.g., for development and validation of OPS algorithms for threat and/or posture detection. For instance, the synthetic OPS images can be used as training data for an OPS algorithm. Generating the synthetic OPS images with the generative AI model alleviates the need for time-consuming, costly and cumbersome data collections and labelling.

In particular, the synthetic OPS images generated by the method can match the realism of real data much better than images simulated with conventional means. For instance, clothing artifacts, systemic noise and object characteristics can be realistically modelled by the generative AI.

For instance, the synthetic on-person screening image(s) show the person or a part of the person according to the provided anatomic information, and show the further object relative to the person at the respective location. The further object can be a threat object, such as a weapon.

For example, the generative AI model is first trained by the labeled OPS images in the database to be able to generate synthetic OPS images, which are as similar as possible to real OPS images (i.e., images captured by a screening device from a real person). The thus trained generative AI model can then generate the at least one synthetic OPS image based on the input and its previous training. Thus, the labeled OPS images in the database can be training data for the generative AI model.

The generative AI model can be executed by a processor or control unit. For instance, this processor or control unit can form a generative AI unit.

For instance, each on-person screening image in the database comprises a respective labeling. The labeling of each on-person screening image in the database can further comprise: a hair style, an ethnicity, a location of origin, and/or a height of the person.

The generated synthetic OPS image(s) can comprise metadata (e.g., labels or descriptors) or such metadata can be generated alongside the synthetic OPS image(s).

The input can comprise instructions for generating the at least one synthetic on-person screening image.

In an implementation form of the first aspect, the input further comprises: a classification, a concealment, a shape, a size, a material and/or a weight of the at least one further object.

In an implementation form of the first aspect, the input comprises a script which comprises instructions for generating a plurality of synthetic on-person screening images for the at least one further object in different locations, orientations, shapes and/or sizes. This achieves the advantage that the generation of a large number of synthetic OPS images can be instructed in an efficient manner.

For instance, upon receiving the script, the generative AI model can be configured to generate the plurality of synthetic on-person screening images based on the instructions in the script.

In an implementation form of the first aspect, the input interface is configured to execute the script. For instance, the input interface can comprise a communication interface configured to receive the script and a processor which executes the script and forwards the instructions to the generative AI model.

In an implementation form of the first aspect, the input interface comprises a user interface and the input is a manual user input. For instance, the input can comprise a text prompt, a sketch and/or a drawing.

In an implementation form of the first aspect, the input comprises at least one existing on-person screening image and information on how to modify said at least one existing on-person screening image. For instance, the information indicates how to modify the existing on-person image in relation to the at least one further object.

This achieves the advantage that new synthetic OPS images can be generated based on existing OPS images. For instance, the generated synthetic OPS image can show specific threats (e.g., a person with a concealed object in a specific location) and can be used to train an OPS algorithm for detecting said threats. The existing on-person screening image can be an OPS image which was recorded (i.e., measured) with a body scanner or comparable scanning device on a real person.

The information on how to modify said image can be provided as a sketch (e.g., drawn into the existing OPS image) and/or as a text prompt.

In an implementation form of the first aspect, the method further comprising the steps of: virtualizing the at least one existing on-person screening image; generating at least one synthetic image of the object using information from the at least one virtualized on-person screening image; and modifying the at least one existing on-person screening image by inserting at least a section of the generated synthetic image(s) of the object into the respective existing image(s) of the person.

The thus modified on-person screening images can form the synthetic OPS image(s). The existing on person screening images can be recorded OPS images of a real person.

Each of the at least one existing on-person screening images can be a frame of a body scan of a person. Thus, the existing on-person screening images can be combined to a video.

The virtualization of the existing OPS image can be carried out by an AI model, e.g., utilizing deep learning techniques. For instance, the AI model can be identical to the generative AI model. The AI model can be executed by or can comprise at least one neural network, e.g. a generative adversarial network (GAN).

In an implementation form of the first aspect, the at least one synthetic image of the object is generated based on a posture of the person in the at least one virtualized image and at least one of: a location of the object relative to the person, a size of the object relative to the person, and a weight of the object.

In an implementation form of the first aspect, the method comprises the further step of: determining a shadow effect caused by the object on the body in the virtualized image; wherein the step of modifying the at least one existing on-person screening image comprises adding the shadow effect to the at least one existing image.

In an implementation form of the first aspect, the input comprises a sketch or a drawing of the person with or without the at least one further object. For instance, the anatomic information is provided in the form of the sketch or drawing.

In an implementation form of the first aspect, the at least one synthetic on-person screening image is a synthetic MRI image, a synthetic mmWave image, a synthetic terahertz image or a synthetic nuclear resonance image.

Likewise, the labeled on-person screening images in the database, which are used for training the generative AI model, can comprise MRI images, mmWave images, terahertz images or nuclear resonance images.

The synthetic on-person screening images and/or the labeled on-person screening images can be 2D or 3D images.

In an implementation form of the first aspect, the generative AI model is implemented by a generative adversarial network (GAN) and/or a variational autoencoder (VAE).

In an implementation form of the first aspect, the generative AI model is configured to execute a diffusion model and/or a large language model (LLM) to generate the at least one synthetic on-person screening image.

For instance, the LLM comprises a text encoder, a control module, or a auto-encoder (variational auto-encoder). The LLM can be a generative pre-trained transformer (GPT), e.g. a MI-GPT.

According to a second aspect, the present disclosure relates to a method for training a machine learning algorithm for threat and/or posture detection in on-person screening images, comprising the steps of: generating at least one synthetic on-person screening image using the method according to the first aspect of the disclosure; feeding the at least one synthetic on-person screening image to the machine learning algorithm; and training a threat and/or posture detection by the machine learning algorithm with the at least one synthetic on-person screening image.

Thus, the synthetic on-person screening image can be used as training data for the machine learning (ML) algorithm. The ML algorithm can be an on-person screening (OPS) algorithm.

For instance, the step of training the threat and/or posture detection by the ML algorithm comprises: adapting the machine learning algorithm based on the training results.

According to a third aspect, the present disclosure relates to a system for generating synthetic on-person screening images. The system comprises: a database of labeled on-person screening images, wherein a labeling of a respective on-person screening image in the database indicates: the presence of an object in the on-person screening image, and in case the object is present, at least one of: a classification of the object, a location of the object, a size of the object, a material of the object and a weight of the object. The system further comprises a generative artificial intelligence (AI) model; wherein, during a training routine, the generative AI model is configured to receive at least some of the labeled on-person screening images from the database; and an input interface configured to receive an input, wherein the input comprises: anatomic information of a person, information on a presence or absence of at least one further object, and/or information on a location of the further object relative to the person. The generative AI model is configured to generate at least one synthetic on-person screening image based on the input.

In an implementation form of the third aspect, the input interface comprises a user interface and/or a communication interface.

The generative AI model can be executed by a processing unit of the system.

In an implementation form of the third aspect, the system comprises a neural network which is configured to execute the generative AI model.

In an implementation form of the third aspect, the neural network is a generative adversarial network (GAN) and/or a variational autoencoder (VAE).

According to a fourth aspect, the present disclosure relates to a method for modifying synthetic on-person screening images. The method comprises the steps of: providing a first database of recorded on-person screening images of real persons; providing a second database of synthetic on-person screening images; training a generative artificial intelligence, AI, model by feeding at least some of the recorded on-person screening images in the first database and at least some of the synthetic on-person screening images in the second database to the generative AI model; receiving a further synthetic on-person screening image at the generative AI model; and modifying the further synthetic on-person screening image with the generative AI model.

The generative AI can utilize deep learning techniques to adapt the further simulated image. The generative AI model can be executed by at least one neural network, e.g. a generative adversarial network (GAN).

In an implementation form of the fourth aspect, the synthetic on-person screening images in the second database and/or the further synthetic on-person screening image are generated by a physics simulation.

In an implementation form of the fourth aspect, the generative AI model is trained to detect characteristic differences between synthetic and recorded on-person screening images.

In an implementation form of the fourth aspect, the generative AI model adapts the simulated on-person screening image to mimic the appearance of a recorded on-person screening image.

According to a fifth aspect, the present disclosure relates to augmenting real scans of persons with generative AI model to add threats, and to auto-label the resulting datasets regarding the object added or not added. Therefore, at least one on-person screening image of a person is recorded; the at least one on-person screening image is then virtualized by means of the generative AI model thereby generating a virtual twin of the image. Furthermore, at least one synthetic image of an object (e.g., a threat object, such as a knife) is generated using information from the virtual twin of the on-person screening image. For instance, the target object is simulated within the virtual twin image. The at least one recorded on-person screening image is then modified by inserting at least a section of the generated synthetic image(s) of the object into the respective recorded image(s) of the person.

For example, the resulting augmented OPS image is labeled accordingly (e.g., based on the added threat) and forwarded to a database of training images.

Furthermore, a shadow caused by the object on the body can be simulated in the virtualized image and added to the at least one recorded image to further augment the recorded image.

According to a sixth aspect of the present disclosure, an AI model is trained to determine the difference between synthetic microwave images and measured microwave images in order to create high-fidelity microwave images. The AI is therefore trained on a dataset of synthetically generated microwave images and a dataset of measured scans of human bodies (i.e., on-person screening images). In this way, a machine learning driven transfer function of the AI can be generated that can receive a synthetic OPS image (e.g., a microwave image) and transforms this image into the appearance of a measured microwave image.

In an example, this transfer function is completely data-driven and does not use knowledge about physical attributes of the OPS images.

According to a seventh aspect of the present disclosure, the AI model is trained not to create microwave images, but instead to create other highly realistic antenna measurement data for use in training algorithms or for creating simulation software. Therefore, for example, the methods according to the fourth or sixth aspect of the present disclosure can be adapted to train the AI based on a dataset of synthetically generated antenna measurement data and/or a dataset of recorded antenna measurement data (i.e., recorded in real life measurements). Based on this training, the AI can adapt synthetic (e.g., simulated) antenna measurement data to generate highly realistic antenna measurement data.

BRIEF DESCRIPTION OF THE DRAWINGS

The above described aspects and implementation forms of the present disclosure will be explained in the following description of specific embodiments in relation to the enclosed drawings, in which.

DETAILED DESCRIPTIONS OF EMBODIMENTS

Figure 1:
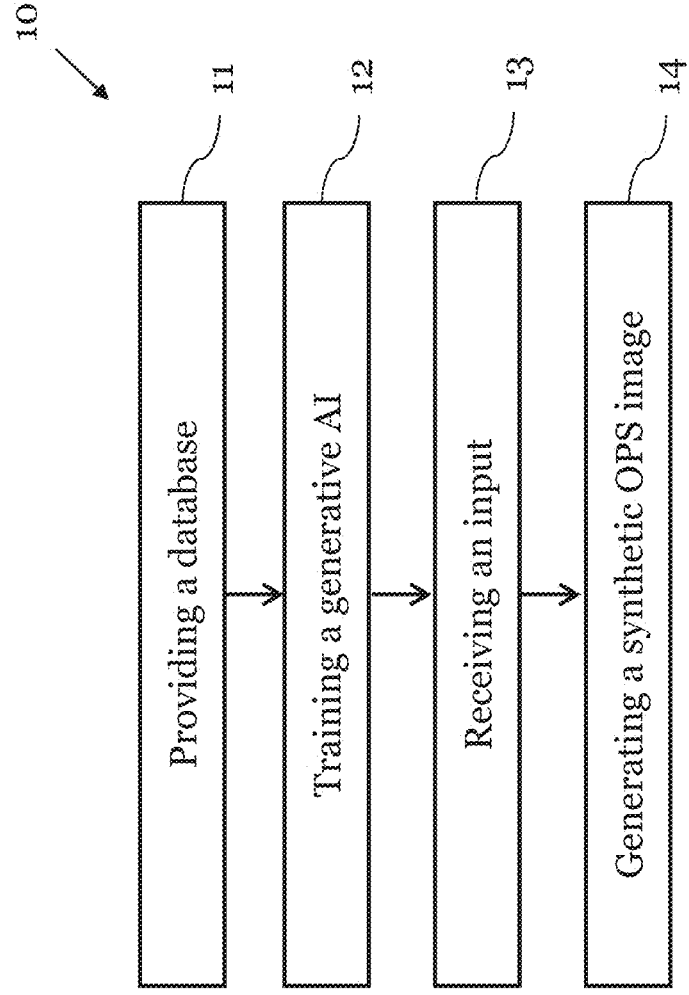
FIG. 1 shows a flow diagram of a method for generating synthetic on-person screening images according to an embodiment.

FIG. 1 shows a flow diagram of a method 10 for generating synthetic on-person screening images according to an embodiment.

The method 10 comprises the step of providing 11 a database of labeled on-person screening images, wherein a labeling of a respective on-person screening image in the database indicates: the presence of an object in the on-person screening image, and, in case the object is present, at least one of: a classification of the object, a location of the object, a size of the object, a material of the object and a weight of the object. The method 10 further comprises the steps of: training 12 a generative AI model by feeding at least some of the labeled on-person screening images in the database to the generative AI model; and receiving 13 an input for generating synthetic on-person screening images at an input interface, wherein the input comprises: anatomic information of a person, information on a presence or absence of at least one further object, and/or information on a location of the further object relative to the person. The method 10 comprises the further step of generating 14 at least one synthetic on-person screening image with the generative AI model based on the input.

The labeled on-person screening (OPS) images in the database can comprise existing images which were, e.g., captured by a personnel security scanner or a comparable screening device.

The labeled OPS images can show a subject, e.g. a person or a part of a person, and an optional object relative to the person. The object can be weapon which is concealed by the person, e.g., under a layer of clothing.

Each OPS image in the database can comprise one or more labels (e.g., in the form of metadata and/or annotations). The label(s) of an image can indicate various information on an object shown in an image. For instance, the label(s) can indicate the classification of the object (e.g., "weapon", or more specific: "knife") and/or the location of the object relative to the person (e.g., "on the hip" or "in the right hand").

The OPS data (labeled OPS images) with all their annotations and metadata (i.e., labels) can be used to train 12 the generative AI model. In particular, the OPS images in the database can from training data for the generative AI model.

Based on the training 12 and the received input 13, the generative AI model can generate 14 authentic, synthetic OPS images. Hereby, authentic means that the synthetic OPS images are as indistinguishable as possible to real OPS images (i.e., OPS images of a person captured with a scanning device). The generated synthetic OPS images can also comprise respective labels (e.g., annotation and/or metadata).

For instance, the labeled OPS images in the database comprise MRI images, mmWave images, terahertz images and/or nuclear resonance images. When trained on these images, the generative AI model can generate the synthetic on-person screening images as synthetic MRI images, synthetic mmWave images, synthetic terahertz images and/or synthetic nuclear resonance images.

The input which is received on the input interface can comprise instructions for generating the at least one synthetic OPS image. This input can comprise additional information on the person and/or the further object to be shown in the synthetic image, such as a type (e.g., knife), a concealment (e.g., beneath one layer of clothing), a shape, a size, a material and/or a weight of the further object. The input can provide guidance to the generative AI model to ensure that only relevant images are generated.

The generative AI model can be implemented by a generative adversarial network (GAN) and/or a variational autoencoder (VAE) for generating the synthetic OPS images.

In one example, the generative AI model is a GAN with two neural networks, a generator neural network and a discriminator neural network. During training 12, the generator neural network can generate synthetic OPS images which are compared to the training data (labeled OPS images in the database) by the discriminator neural network. In this way, the generator neural network can be trained to generate more and more realistic synthetic OPS images.

In a further example, the generative AI model employs a diffusion model combined with a large language model (LLM), e.g. a text encoder or an auto-encoder model or a control model.

For instance, the LLM can receive input in the form of text prompts (in plain language) and generate suitable instructions for the further instances of the generative AI model, e.g. for the diffusion model, to generate the at least one synthetic OPS image.

Figure 2:
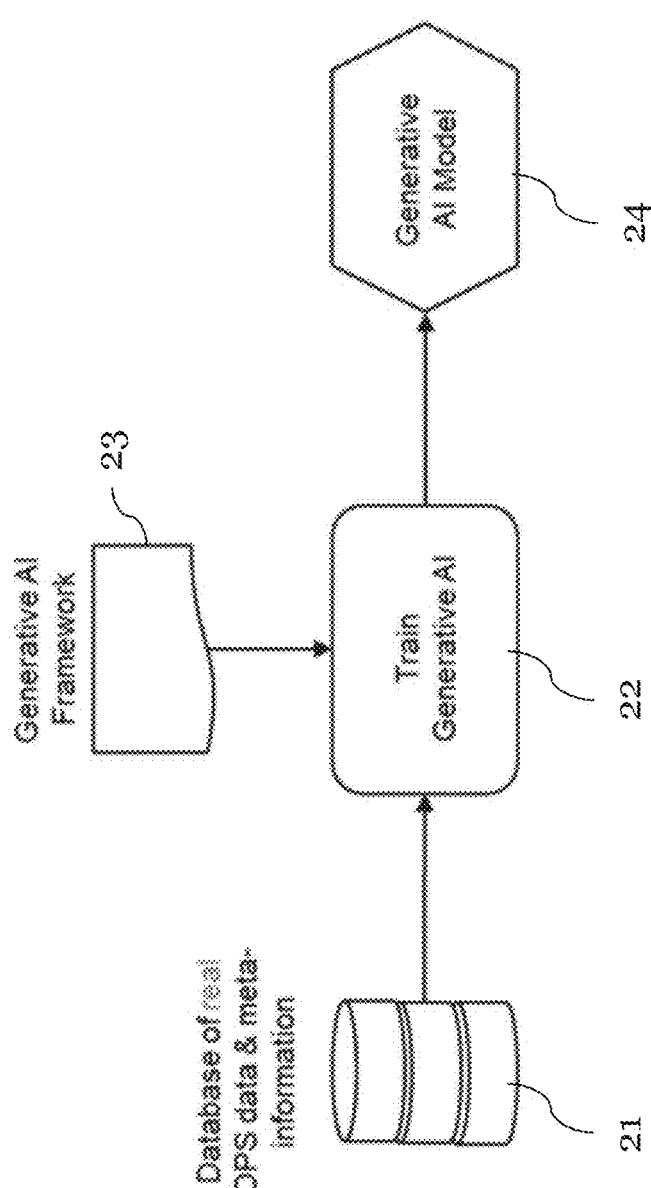
FIG. 2 shows steps of a method for generating synthetic on-person screening images according to an embodiment.

FIG. 2 further visualizes steps 11 and 12 of the method 10 shown in FIG. 1. In particular, FIG. 2 shows how the OPS data and meta-information (i.e., the labeled OPS images) in the database 21 are used to train 22 the generative AI model 23. On the basis of this training, a trained generative AI model 24 can be provided which can generate the synthetic OPS images based on the received input.

Figure 3:
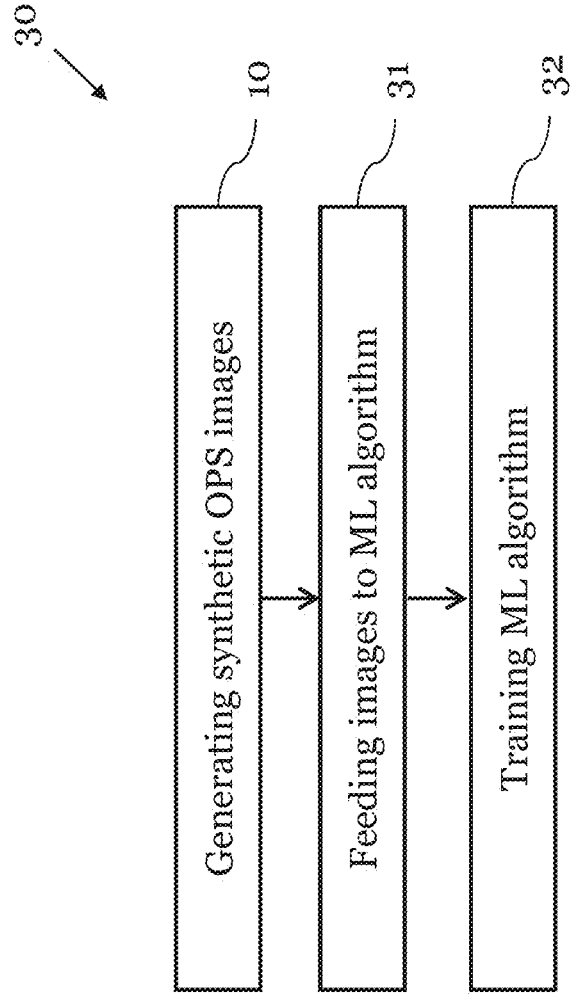
FIG. 3 shows a flow diagram of a method for training a machine learning algorithm for threat and/or posture detection in on-person screening images according to an embodiment.

FIG. 3 shows a flow diagram of a method 30 for training a machine learning (ML) algorithm for threat and/or posture detection in on-person screening images according to an embodiment.

The method 30 comprises the steps of: generating 10 at least one synthetic on-person screening image, e.g. using the method 10 shown in FIG. 1; feeding 31 the at least one synthetic on-person screening image to the ML algorithm; and training 32 a threat and/or posture detection by the ML algorithm with the at least one synthetic on-person screening image.

Figure 8:
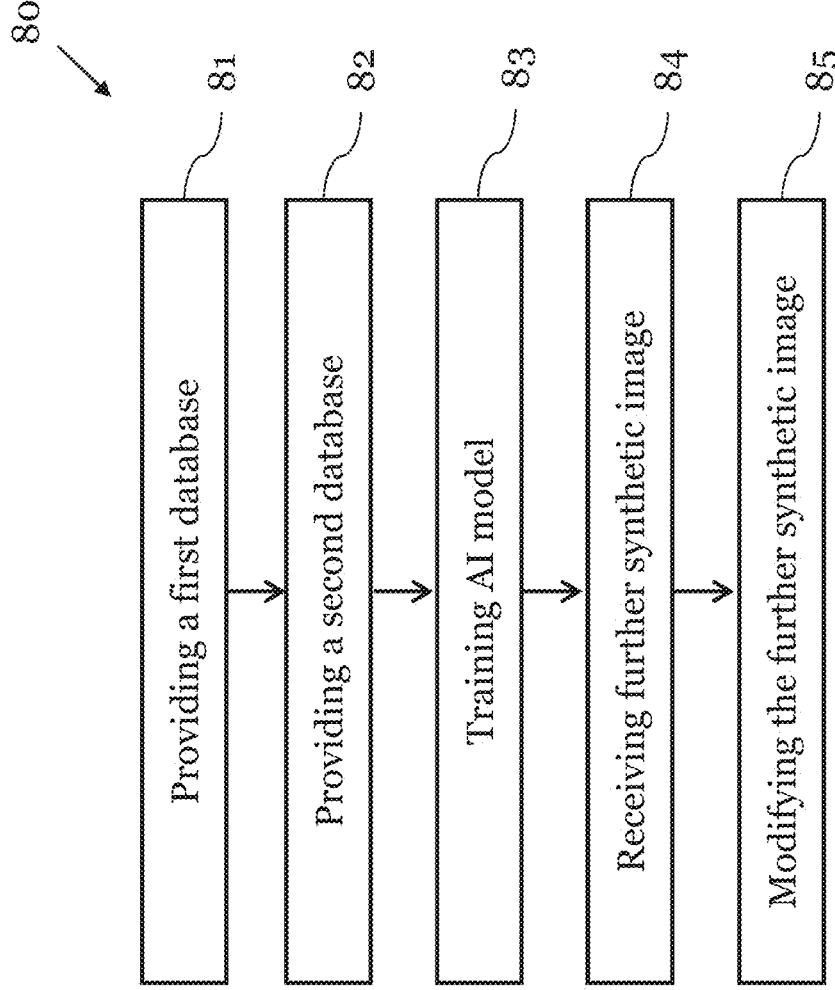
FIG. 8 shows a flow diagram of a method for modifying synthetic on-person screening images according to an embodiment.

Alternatively, the at least one synthetic on-person screening image which is fed 31 to the ML algorithm could also be generated by modifying a synthetic image, as shown in FIG. 8.

The ML algorithm can be an OPS algorithm which is configured to detect threats (e.g., concealed weapons) and/or postures in OPS images.

The synthetic on-person screening (OPS) images, which are generated by the method 10 shown in FIG. 1, can be used as training data for training the OPS algorithm. In this way, realistic data for development and validation of the ML algorithms can be provided while, at the same time, the need for time-consuming, costly and cumbersome data collections and labelling of "real" OPS images is alleviated. In particular, since the synthetic OPS images can be generated semi-automatically or even automatically using the method 10 shown in FIG. 1, the development and validation of the ML algorithm can be sped up and costs can be reduced.

Depending on the training requirements of the ML algorithm, the synthetic OPS images can be generated to include specific threats (e.g., concealed knifes) and/or specific postures of a person. Thus, the training/validation of the ML algorithm can be quickly adapted to emerging threats (e.g., new types of weapons, concealments) and new requirements. Furthermore, a much wider gamut of samples can be generated for this training/validation, which would not be available with real, manually collected images.

For instance, the step of training 32 the threat and/or posture detection by the ML algorithm further comprises adapting the machine learning algorithm based on the training results.

Figure 4:
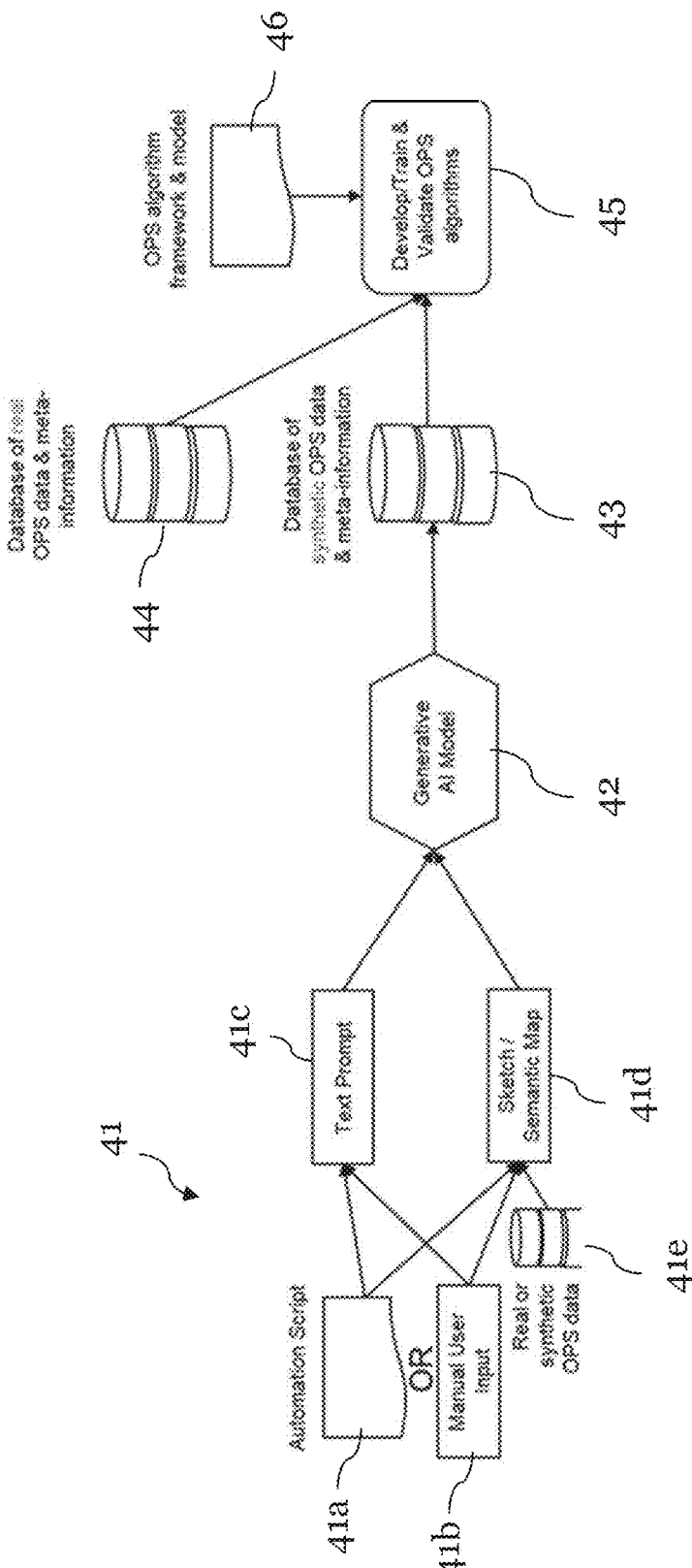
FIG. 4 shows steps of a method for training a machine learning algorithm for threat and/or posture detection in on-person screening images according to an embodiment.

FIG. 4 further visualizes the ML algorithm training based on the synthetic OPS image generation.

As shown in FIG. 4, the generative AI model can receive various types of input 41, such as manual user input 41*b* or automation scripts 41*a*, at the input interface.

For instance, the input interface is a user interface and the input 41 comprises manual user input 41*b*, such as text-prompts 41*c*, user-provided sketches and/or semantic maps 41*d*, comprising instructions for generating the at least one synthetic OPS image. This user-provided condition information can either be fed directly to the generative AI model 42 to generate the desired samples (synthetic OPS images) according to the instructions, or it can be paired with pre-existing OPS images 41*e*, wherein the generative AI model 42 can be configured to alter the pre-existing OPS image content according to the instructions.

The input 41 can further comprise an automated script 41*a* which comprises instructions for generating a plurality of synthetic OPS images. For instance, the plurality of OPS images can show the at least one further object in different locations, with different concealments, with different shapes, with different sizes, with different materials and/or with different weights.

By using such a script, the entire image generation procedure can be fully automated. The script can automatically generate text prompts or semantic maps, allowing for batch-like, large-scale generation of OPS data samples and their meta-data. For instance, the input interface comprises a processor configured to execute the script.

The generative AI model 42 can feed the generated synthetic OPS images to a database 43 of synthetic OPS data. Thereby, each generated synthetic OPS image can comprise meta-information (e.g., labels which indicate a presence and/or location of a further object in the image).

FIG. 4 further shows that the ML algorithm 46 (e.g., an OPS algorithm framework and model) for threat and/or posture detection, can be trained on the synthetic OPS images from the database 43 and/or on real OPS images from a further database 44. In particular, the synthetic and/or real OPS images can be used to develop train and/or validate the ML algorithm 45.

FIGS. 5A-D show synthetic OPS images according to an embodiment. The images show specific parts of the anatomy of a person with or without an additional object. For instance, these images were generated according to the method 10 shown in FIG. 1.

Figure 5B:
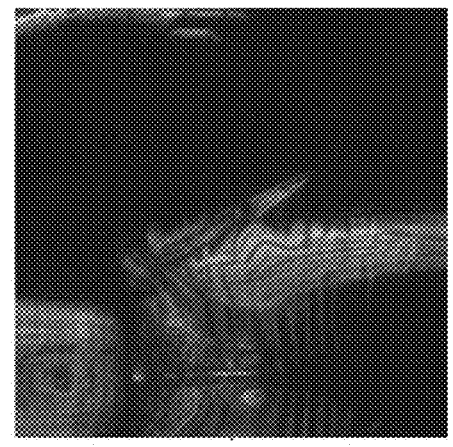
FIGS. 5A-D show synthetic on-person screening images according to an embodiment.
Figure 5D:
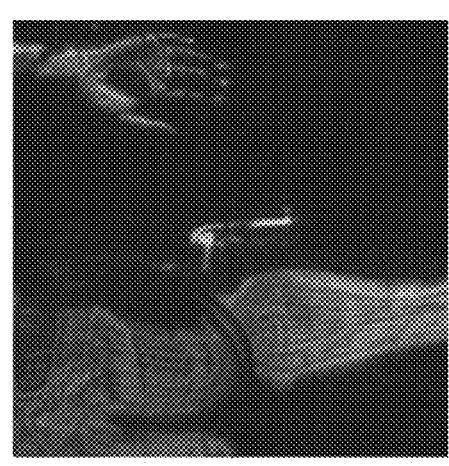
Figure 5A:
Figure 5C:
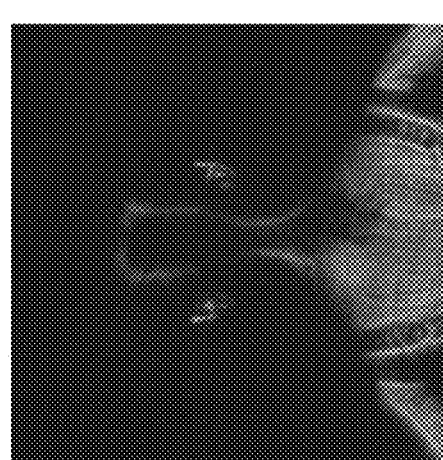

For example, the synthetic images shown in FIG. 5A-D are generated by the generative AI model based on input in the form of text prompts (text-to-image generation). The text prompts for generating the four synthetic images in FIGS. 5A-D could be the following:

FIG. 5A: "Closeup of right hand, male subject, back view";

FIG. 5B: "Closeup of ceramic knife on left thigh, male subject, front view";

FIG. 5C: "Closeup of head, female subject, back view"; and

FIG. 5D: "Closeup of pistol on right thigh, male subject, back view".

Figures 6A, 6B:
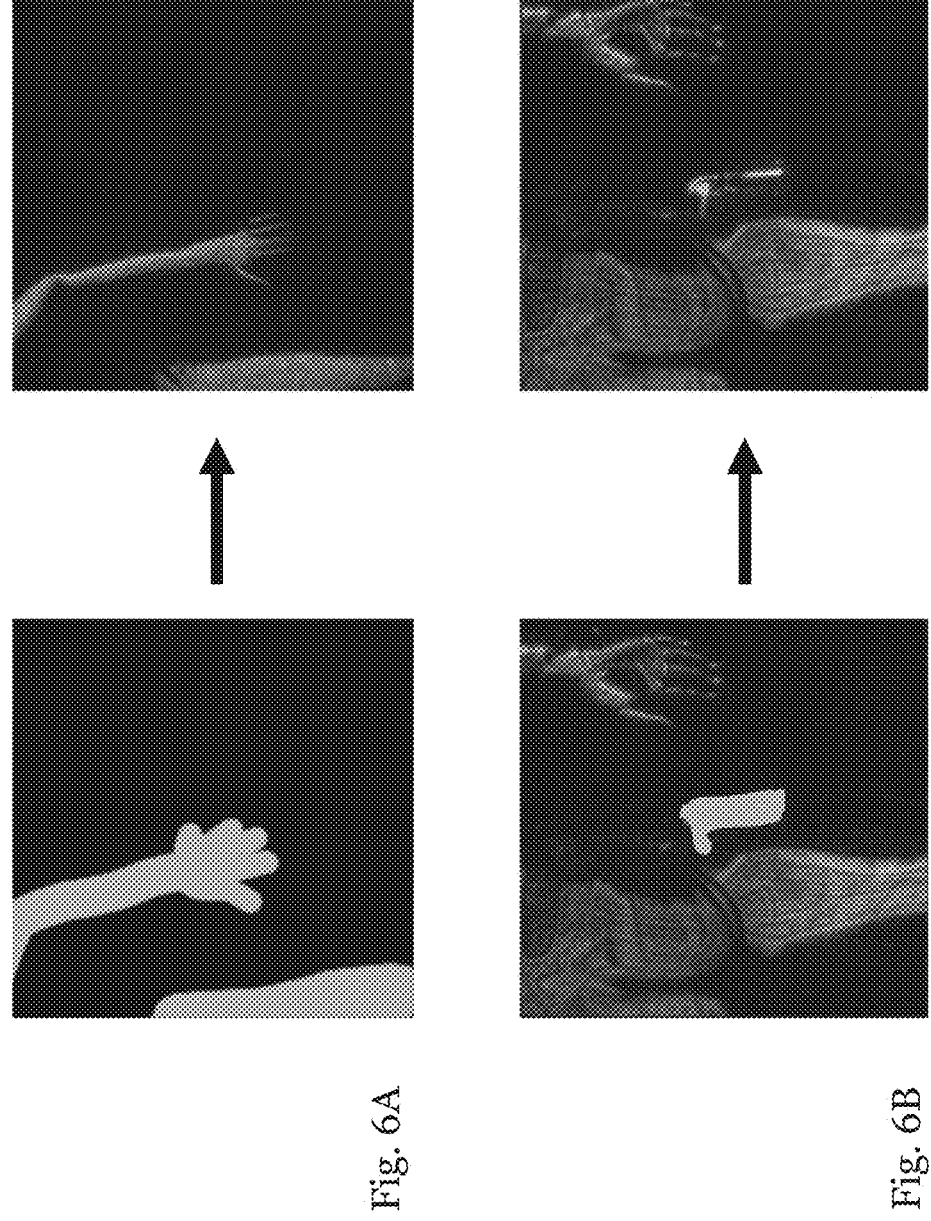
FIG. 6A shows a generation of a synthetic on-person screening image based on input in the form of a sketch or a drawing according to an embodiment.
FIG. 6B shows a generation of a synthetic on-person screening image based on an existing image with a drawn-in sketch of an object according to an embodiment.

FIG. 6A shows a generation of a synthetic image based on input in the form of a sketch or a drawing according to an embodiment (sketch-to-image generation).

The left image in FIG. 6A shows a simple sketch of a close-up of a human arm, which was e.g. generated with a simple drawing program. For instance, the input interface comprises the drawing program (or a user interface thereof) and allows a user to directly draw a sketch of a person and/or object to be shown in the synthetic image.

The generative AI model can generate the synthetic OPS image show in the right image in FIG. 6A based on the sketch, using e.g. a semantic segmentation technique.

FIG. 6B shows a generation of a synthetic image based on an existing OPS image (synthetic or real) with a drawn-in sketch of an object according to an embodiment (image completion and in-painting).

The left image in FIG. 6B shows the existing OPS image with an added sketch of an object (in the shown example: a pistol). The sketch can be added to the OPS image with a simple drawing program.

In this way, the generative AI model can be instructed to locally alter the existing OPS image content according to the added sketch. The right image of FIG. 6B shows the resulting synthetic OPS image generated by the generative AI model based on the input, which features a realistic depiction of the object added with the sketch.

Besides sketching, the information on how to alter the existing OPS image can also be provided by other means (e.g., as a text prompt). In this way, real-life data can be altered to change parts of the anatomy of the depicted person, and/or to add specific (further) objects in specific orientations and also generate labels of the objects.

This adaption of existing OPS data can be automated to generate vast amounts of synthetic images with further objects in specific locations and/or rotations.

Figure 7:
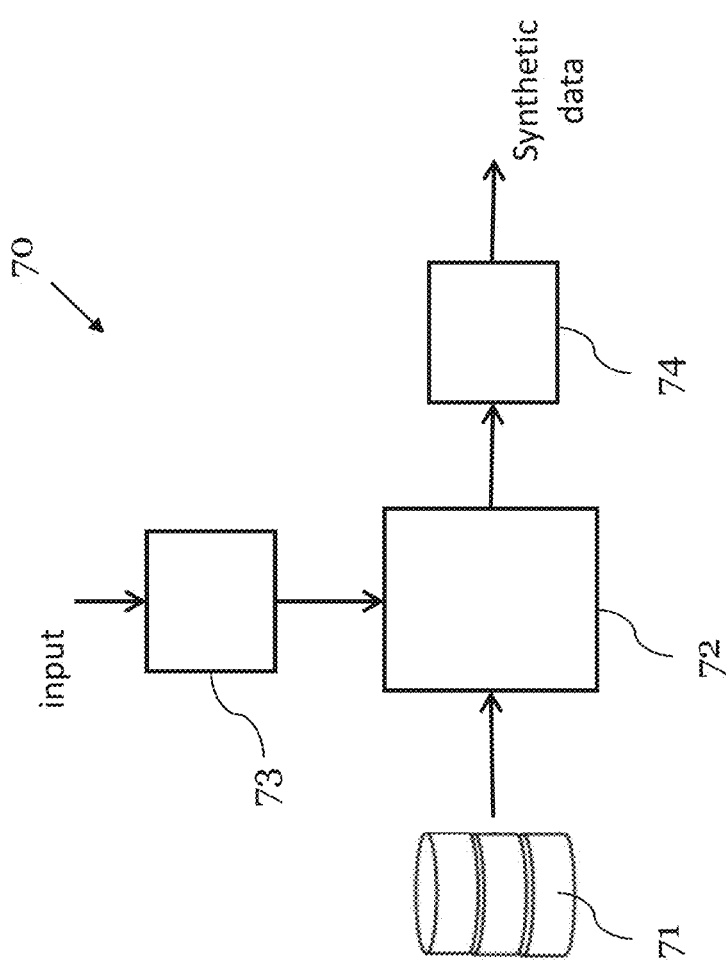
FIG. 7 shows a schematic diagram of a system for generating synthetic on-person screening images according to an embodiment.

FIG. 7 shows a schematic diagram of a system 70 for generating synthetic on-person screening images according to an embodiment.

The system 70 comprises: a database 71 of labeled on-person screening images, wherein a labeling of a respective on-person screening image in the database indicates: the presence of an object in the on-person screening image, and, in case the object is present, at least one of: a classification of the object, a location of the object, a size of the object, a material of the object and a weight of the object. The system 70 further comprises a generative artificial intelligence (AI) model 72; wherein, during a training routine, the generative AI model 72 is configured to receive at least some of the labeled on-person screening images from the database 71; and an input interface 73 configured to receive an input for generating synthetic on-person screening images, wherein the input comprises: anatomic information of a person, information on a presence or absence of at least one further object, and/or information on a location of the further object relative to the person. The generative AI model 72 is configured to generate at least one synthetic on-person screening image based on the input.

The generative AI model 72 can be implemented by a generative adversarial network (GAN) and/or a variational autoencoder (VAE). For instance, the system 70 can comprise a neural network in the form of the GAN and/or VAE, which is configured to execute the generative AI model.

The input interface 73 can be a user interface and/or a communication interface.

The system 70 can further comprise an output interface 74 configured to output the at least one synthetic OPS image, e.g. to a further database for storage.

FIG. 8 shows a flow diagram of a method 80 for modifying synthetic on-person screening images according to an embodiment.

The method 80 comprises the steps of: providing 81 a first database of recorded on-person screening images of real persons; providing 82 a second database of synthetic on-person screening images; training 83 a generative artificial intelligence, AI, model by feeding at least some of the recorded on-person screening images in the first database and at least some of the synthetic on-person screening images in the second database to the generative AI model; receiving 84 a further synthetic on-person screening image at the generative AI model; and modifying 85 the further synthetic on-person screening image with the generative AI model.

The on-person screening images can be microwave images. The recorded on-person screening images can be recorded by a body scanner (or other suitable device) in a real world measurement. The synthetic on-person screening images in the second database and/or the further synthetic on-person screening image can be generated by a physics simulation, i.e., they can be simulated images.

Typically, there are inherent differences between such simulated images and real images (i.e., recorded images). Those differences can be caused by the fact that not every physical detail of a body scanner measurement can be modelled through a simulation process. These differences are difficult to measure and to overcome.

The generative AI model can implement a machine learning driven transfer function which receives the synthetic (simulated) screening image and which transforms this image it into the appearance of a measured (recorded) image. For example, the transfer function can be completely data-driven and does not use knowledge about physical attributes of the microwave measurement.

Figures 9A, 9B:
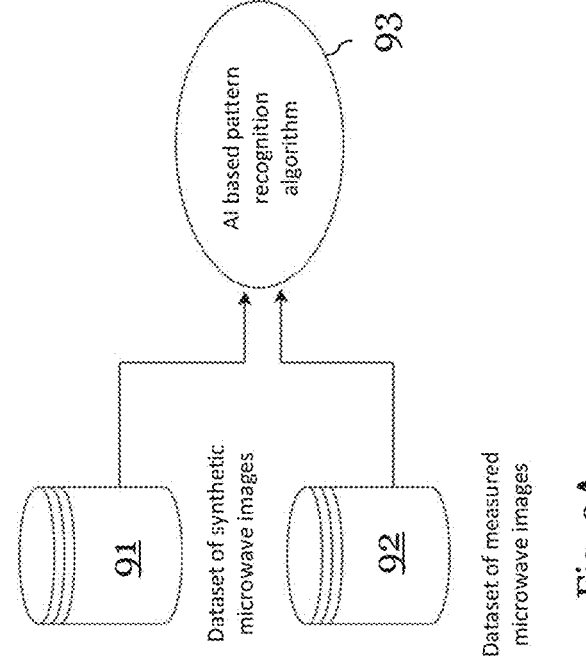
FIGS. 9A-B show schematic diagrams of a training of a generative AI model and of a modification of a synthetic on-person screening images according to an embodiment.

FIG. 9A shows a schematic diagram of the training 83 of the generative AI model 93 for modifying synthetic on-person screening images according to an embodiment.

The generative AI model 93, in particular its transfer algorithm, can be trained by using the first database 91 of synthetically generated images and the second database 92 of recorded on-person screening images. By means of machine learning, the model can learn the differences between these datasets. For example, the generative AI model 93 is trained to detect characteristic differences between synthetic and recorded on-person screening images.

FIG. 9B shows a schematic diagram of a modification 85 of synthetic on-person screening images by the trained generative AI model 95 according to an embodiment.

After the training shown in FIG. 9A, the generative AI can convert a further synthetic on-person screening image into the appearance of a screening image, e.g. a real microwave image. This transformation can be referred to as "style transfer".

For instance, the generative AI model 95 thereby adapts the simulated on-person screening image to mimic the appearance of a recorded (i.e., real life) on-person screening image.

The further synthetic on-person screening image can be received from a database of images 94. The generative AI model can utilize various machine learning technics, such as algorithms like CycleGAN, Denoising Diffusion Probabilistic Models, and Latent Diffusion Models. The thus modified synthetic images can be output to a further database 96.

The method 80 for modifying synthetic images allows to generate highly realistic on-person screening images, e.g. microwave images, based on synthetic/simulated images without putting in the effort of scanning human bodies. In this way, body scanners and comparable scanning devices can leverage synthetically generated data for training and validation of an AI based detection algorithm (e.g., a threat and/or posture detection). This approach can leverage extensive knowledge about the physical processes that are involved in the measurement of a body by microwaves and the physical arrangement of the antennas that do this measurement.

For instance, this method 80 is especially advantageous, due to the inherent differences between simulated microwave images and measured microwave images. This difference can referred to as: "domain shift". Even though a physics simulation may generate deceptively real microwave images, the reality of measured microwave images that are generated by scanning a human body may not be perfectly captured. Differences between synthetically generated and measured microwave images can be caused by the fact that not all involved physical processes can be modelled perfectly in the simulation. These differences can be visible when using a thread detection AI inside a body scanner to evaluate synthetically generated images.

For example, this can cause increased alarm rates with simulated images. E.g., even when the generated images are generated without objects on the body, the AI can detect that multiple objects are in the image. This can be due to the fact that the threat detection AI is trained to raise an alarm whenever an image is not "normal" enough. If the AI is trained only on measured images, simulated images can be too abnormal and do not represent what the AI expects, thus raising an alarm.

Such issues can be avoided when modifying synthetic (e.g., simulated) microwave images with the above method 80.

The above method 80 has the further advantage of being purely data driven. In particular, it does not need knowledge of physical processes that cannot be accurately described. In contrast, in physics based simulations, slightly different calibrations of the antennas might already yield very different results. Also, reflections from objects outside of the scanner area or reflections on different kinds of clothing and objects may be unknown and can possibly not be modelled accurately enough. However, the generative AI approach does not need a prior knowledge of the physical processes.

The proposed algorithm might not be limited to the generation and/or modification of microwave images. It could also be used to generate/modify highly realistic antenna measurements directly (instead of images). Furthermore, it can take advantage of additional information that is given during an image generation process, i.e. using a video feed of a camera that is filming the scan from the outside.

It could further be used to add or remove objects in on-person screening images (e.g., microwave images), making it valuable for training and validation of a thread detection AI.

Figure 10:
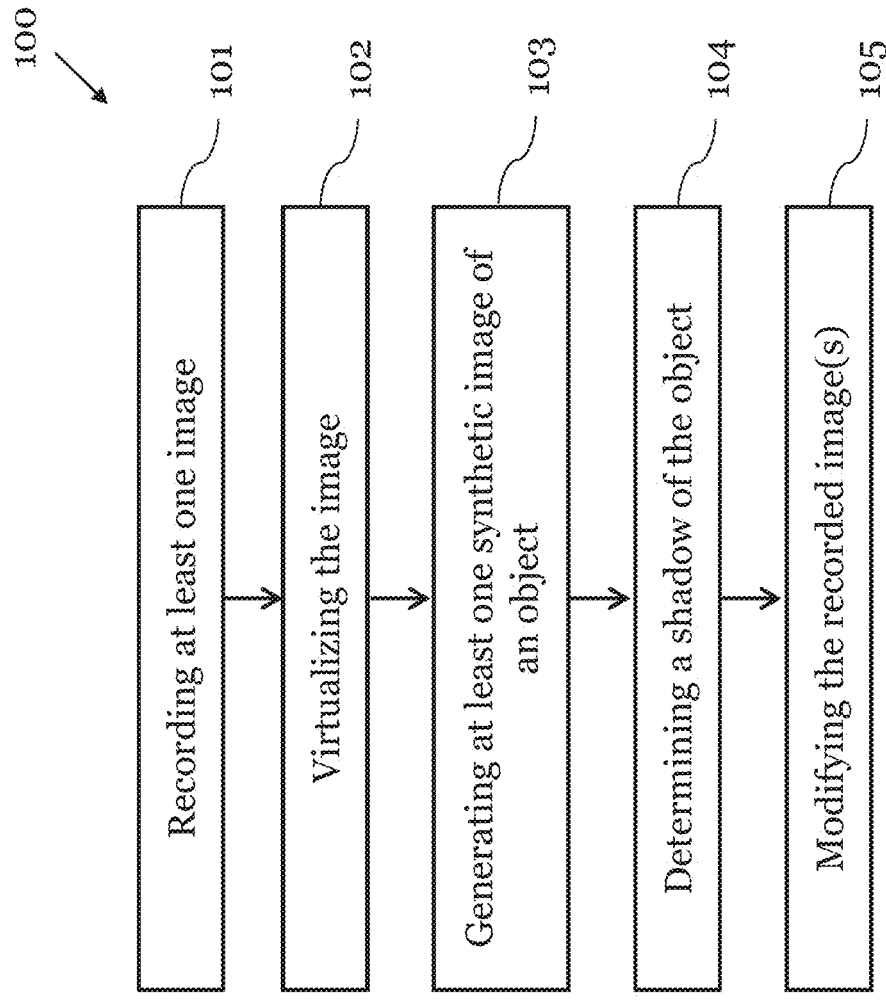
FIG. 10 shows a flow diagram of a method for modifying recorded on-person screening images according to an embodiment.

FIG. 10 shows a flow diagram of a method 100 for modifying recorded on-person screening images according to an embodiment. For instance, this method 100 shows a further possible implementation of adapting an existing OPS image to add an object (e.g., as an alternative or addition to the method shown in FIG. 6B.).

The method 100 comprises the steps of: recording 101 at least one on-person screening image of a person; virtualizing 102 the at least one recorded on-person screening image; generating 103 at least one synthetic image of an object using information from the at least one virtualized on-person screening image; and modifying 105 the at least one recorded on-person screening image by inserting at least a section of the generated synthetic image(s) of the object into the respective recorded image(s) of the person.

The method 100 can be used to generate synthetic data for personnel security screening by enhancing measured data with electromagnetic simulation results. This synthetic data might be a good choice to improve machine learning algorithms (e.g., for threat and/or posture detection).

Besides adding target objects this method could also add clothing effects or environmental influences by physically simulating these effects. Since detailed CAD object information is available when training machine learning algorithms, it might improve automatic target recognition (ATR) performance, reduce false alarm rate (FAR), improve target object classification, and improve user specific target object handling.

Each of the at least one recorded on-person screening images can be a frame of a body scan of a person. Thus, the recorded on-person screening images can be combined to a video. For instance, the recorded on-person screening images are recorded by a body scanner, e.g. walkthrough body scanner.

The at least one synthetic image of the object can be generated 103 based on a posture of the person in the at least one virtualized image and at least one of: a location of the object relative to the person, a size of the object relative to the person, and a weight of the object.

The at least one synthetic image of the object can be generated by an artificial intelligence, AI, model.

As shown in FIG. 10, the method 100 can comprise the optional step of: determining 104 a shadow caused by the object on the body in the virtualized image. In case such a shadow is determined, the step of modifying 105 the at least one recorded on-person screening image can comprises adding the shadow to the at least one recorded image.

Figure 11:
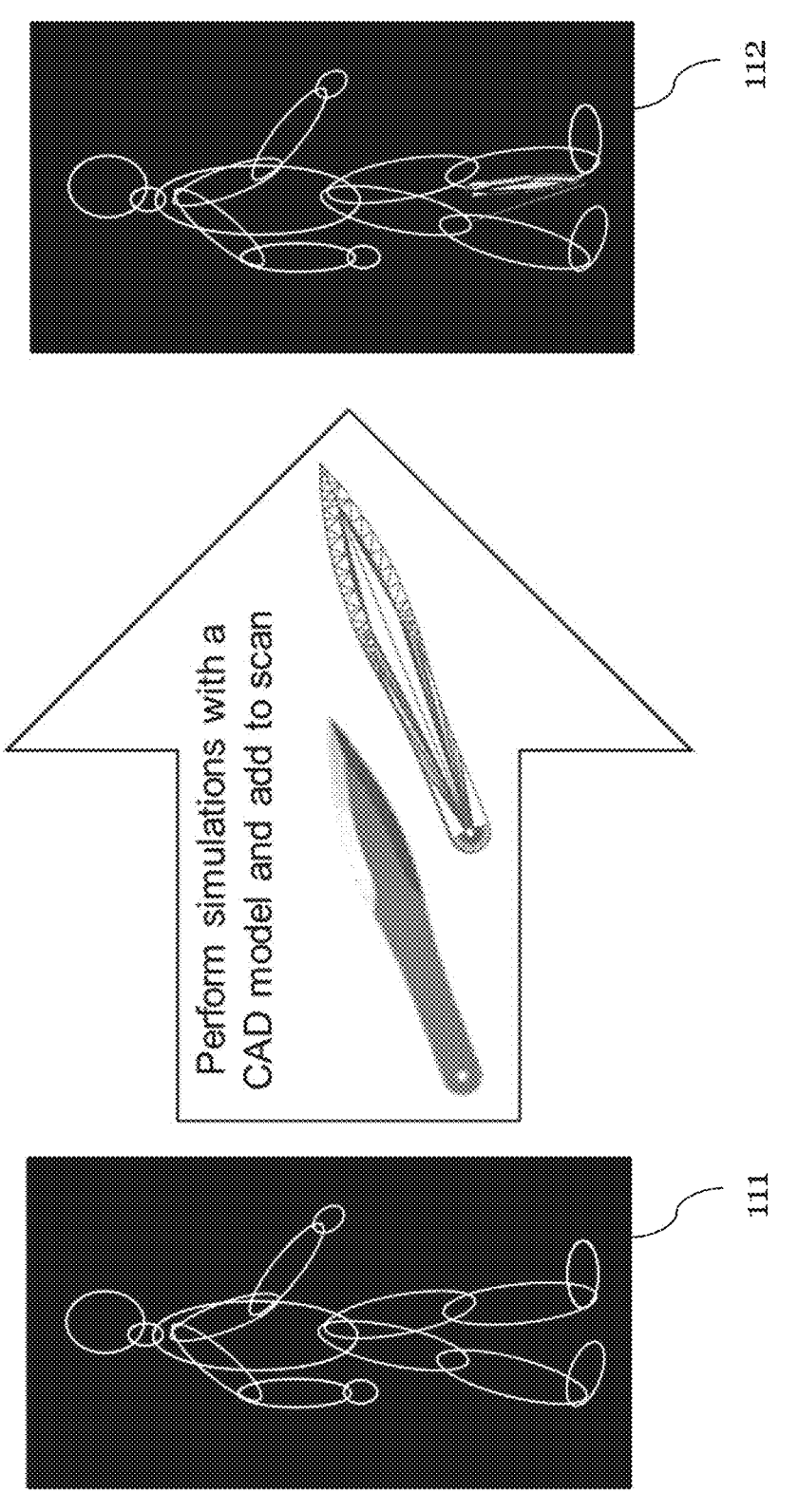
FIG. 11 shows steps of a method for modifying recorded on-person screening images according to an embodiment.

FIG. 11 shows steps of the method for modifying recorded on-person screening images according to an embodiment. The on-person screening image can be body scan of a person.

Starting form a real scan 11 of the person without an object, an object can be simulated, e.g. in form of a CAD model, and can be added to the scan. This results in a modified version of the scan 112, e.g. a real scan which is augmented with a simulated object. For instance, the object can be a threat object, such as a knife.

Figure 12A:
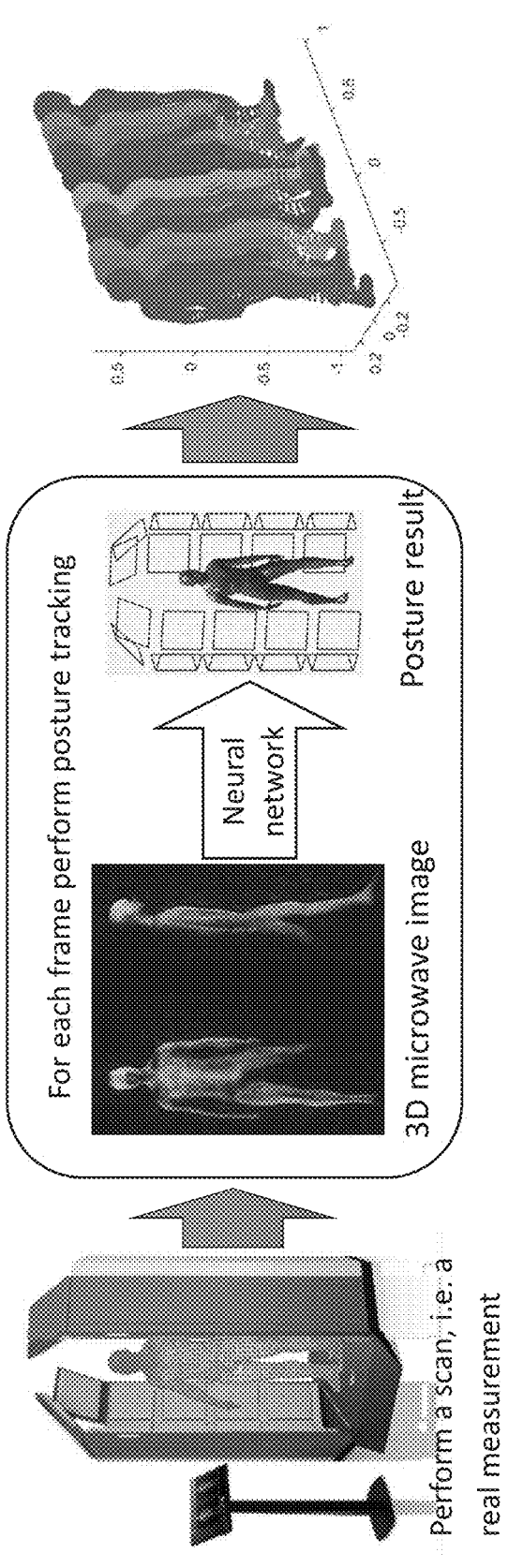
FIGS. 12A-C show steps of a method for modifying recorded on-person screening images according to an embodiment.
Figure 12B:
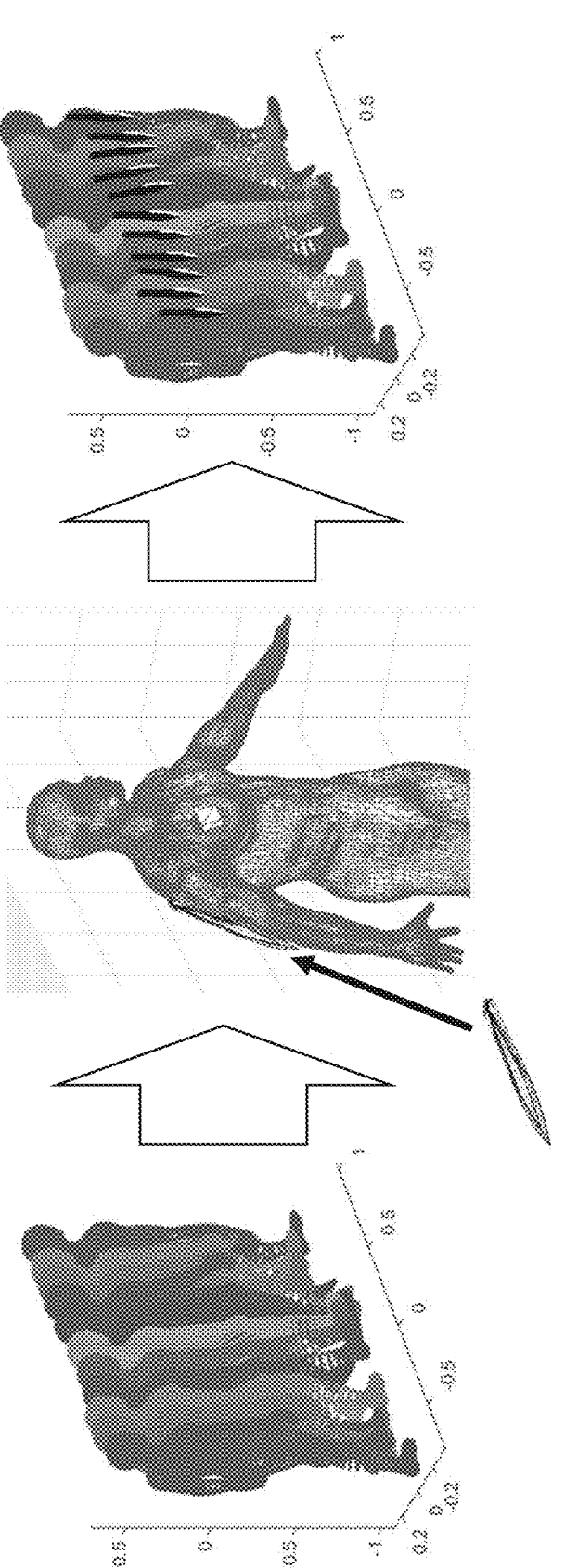
Figure 12C:
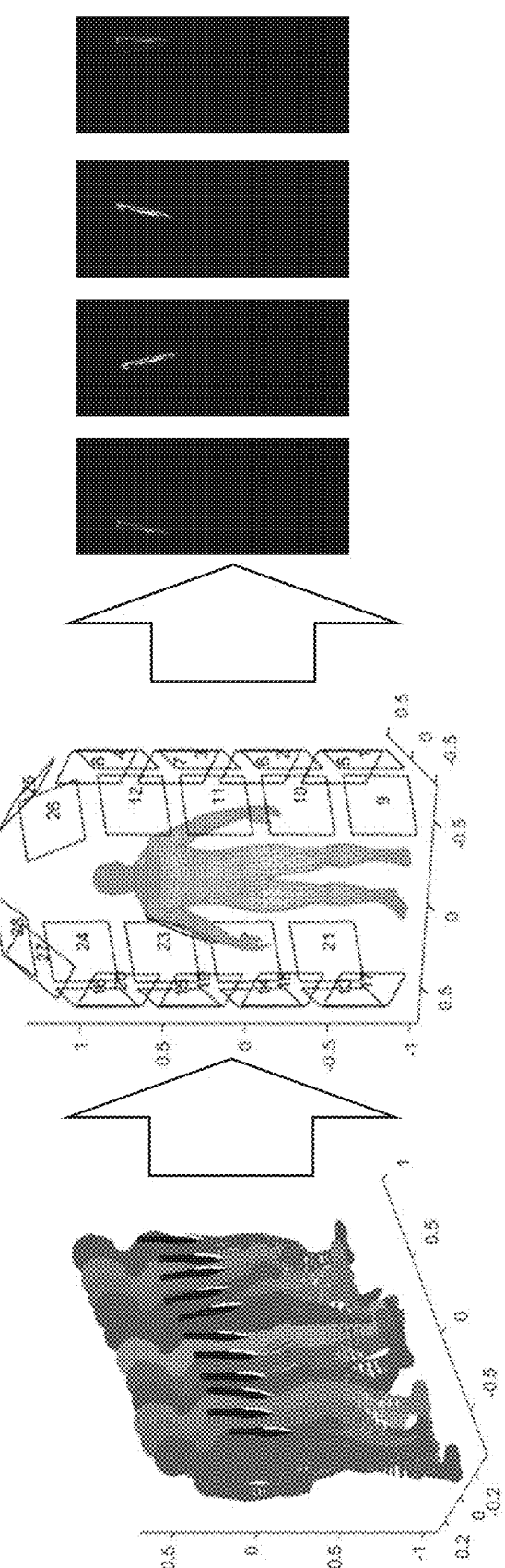

FIGS. 12A-C show detailed steps of the method for modifying recorded on-person screening images according to an embodiment.

As shown in FIG. 12A, a real measurement of a person, e.g. a body scan, can be performed. This body scan can be performed by a body scanner, e.g. a walkthrough body scanner, which records multiple frames (i.e., multiple consecutive images). Each frame can be a 3D microwave image.

For each frame, the AI model can generate a virtual twin. Thereby, the AI model can extract a posture of the body in the image and generate the virtual twins based on the postures. The virtual twins can comprise CAD information for each frame. The right image in FIG. 12A show the virtual twins for each frame.

As shown in FIG. 12B, the target object can be added to the virtual twins. For instance, the object (in FIG. 12B a knife) can be attached to an avatar of the person. This generated the augmented virtual twins shown in the right image in FIG. 12B.

FIG. 12C shows how the target object can be simulated within the virtual twin. For instance, the target object can be electromagnetically simulated in each frame by considering shadowing effects from the body. Based on this simulation, synthetic screening images (e.g., synthetic microwave images) which sow the embedded target object can be simulated for each frame of the recorded images.

Figure 13:
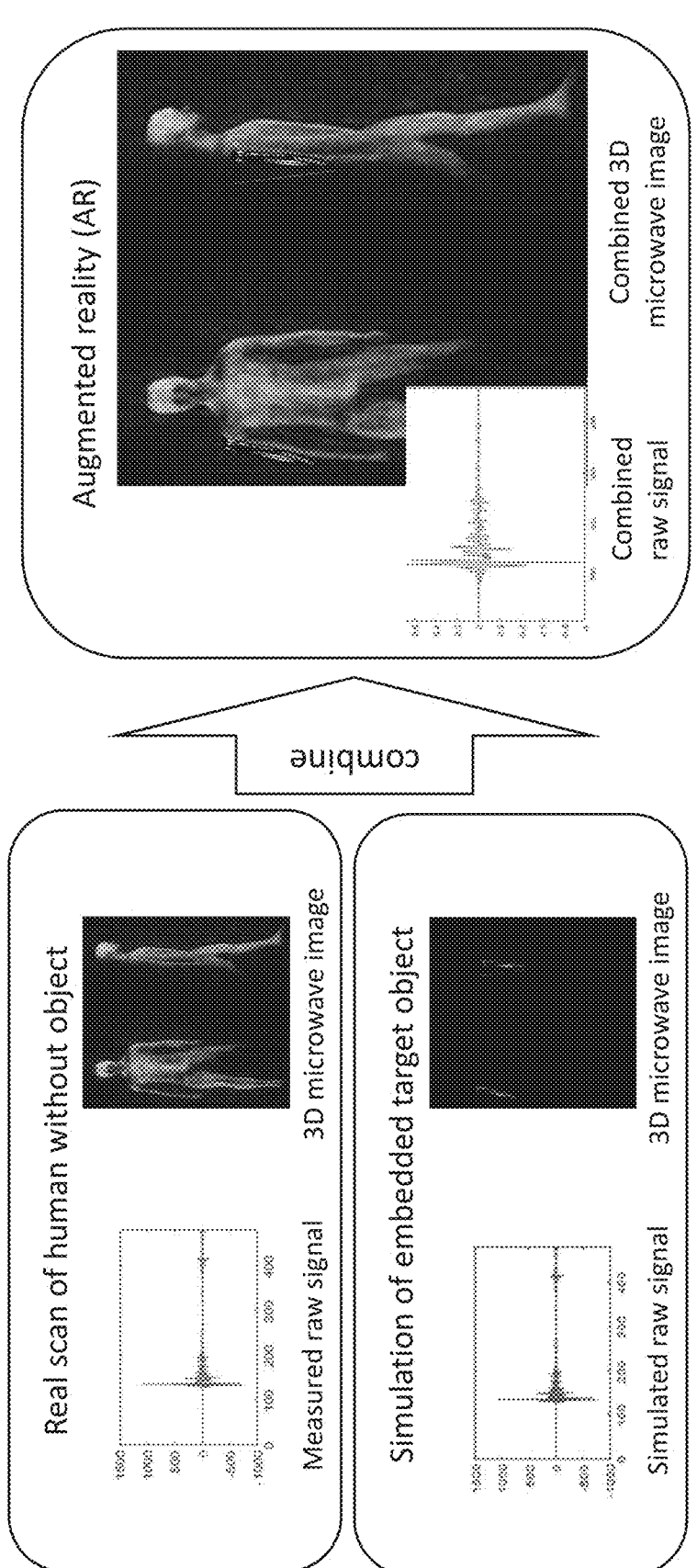
FIG. 13 shows steps of a method for modifying recorded on-person screening images according to an embodiment.

FIG. 13 shows merging of the recorded screening images and the corresponding synthetic (simulated) images of the target object. This results in a combined image which is based on the recorded image and shows the target object. This combined image can be referred to as augmented reality (AR) image, as the reality of the recorded image is augmented by the simulated image of the object. FIG. 13 also shows the combination of the recorded (i.e., measured) and simulated raw signals.

Figure 14:
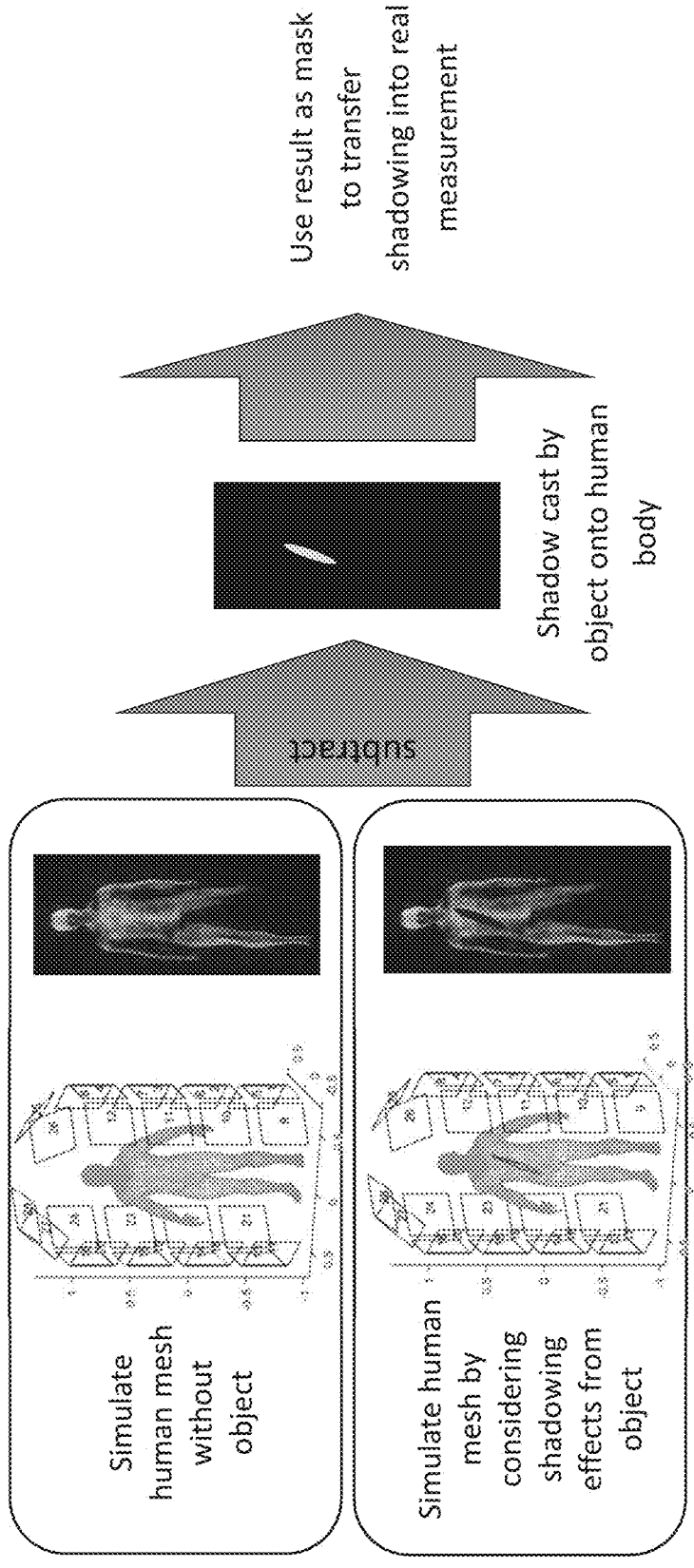
FIG. 14 shows steps of a method for modifying recorded on-person screening images according to an embodiment.

FIG. 14 shows further steps of the method for modifying the recorded screening images. Thereby, a shadowing of the human in the image by the added object is simulated.

Therefore, a human mesh without the object is simulated (e.g., according to FIG. 12A). Then, the human mesh is simulated by considering shadowing effects from the object. Both of these simulations are subtracted from each other, generating an image of the shadow cast by the object onto the human body. This result can be used as mask to transfer the shadowing onto the recorded image.

The transfer of the shadowing to the "real measurement" (recorded image) can be performed on the real source measurement before embedding the simulated target object.

For instance, the shadow is added by heuristically applying the simulated mask by reducing the image intensity in the shadow region. A greyscale mask with soft edges cam be used to obtain realistic fringing effects.

To reduce computational effort, only body parts which are close to the object can be simulated.

The invention claimed is:

1. A method for generating synthetic on-person screening images, comprising the steps of:
   providing a database of labeled on-person screening images, wherein a labeling of a respective on-person screening image in the database indicates:
   the presence of an object in the on-person screening image,
   and, in case the object is present, at least one of: a classification of the object, a location of the object, a size of the object, a material of the object and a weight of the object;
   training a generative artificial intelligence, AI, model by feeding at least some of the labeled on-person screening images in the database to the generative AI model;
   receiving an input at an input interface, wherein the input comprises:
   anatomic information of a person,
   information on a presence of at least one further object, wherein the at least one further object is external to the person, and
   information on a location of the further object relative to the person;
   generating at least one synthetic on-person screening image with the generative AI model based on the input,
   wherein the input comprises a script which comprises instructions for generating a plurality of synthetic on-person screening images for the at least one further object in different locations, orientations, shapes and/or sizes.

2. The method of claim 1,
   wherein the input further comprises: a classification, a concealment, a shape, a size, a material and/or a weight of the at least one further object.

3. The method of claim 1, wherein the input interface is configured to execute the script.

4. The method of claim 1, wherein the input interface comprises a user interface and the input is a manual user input.

5. The method of claim 1, wherein the input comprises at least one existing on-person screening image and information on how to modify said at least one existing on-person screening image.

6. The method of claim 5, further comprising the steps of:

virtualizing the at least one existing on-person screening image;

generating at least one synthetic image of the object using information from the at least one virtualized on-person screening image; and modifying the at least one existing on-person screening image by inserting at least a section of the generated synthetic image(s) of the object into the respective existing image(s) of the person.

7. The method of claim 6, wherein the at least one synthetic image of the object is generated based on a posture of the person in the at least one virtualized image and at least one of: a location of the object relative to the person, a size of the object relative to the person, and a weight of the object.

8. The method of claim 6, further comprising the step of:

determining a shadow effect caused by the object on the body in the virtualized image;

wherein the step of modifying the at least one existing on-person screening image comprises adding the shadow effect to the at least one existing image.

9. The method of claim 1, wherein the input comprises a sketch or a drawing of the person with or without the at least one further object.

10. The method of claim 1, wherein the at least one synthetic on-person screening image is a synthetic MRI image, a synthetic mmWave image, a synthetic terahertz image or a synthetic nuclear resonance image.

11. The method of claim 1, wherein the generative AI model is implemented by a generative adversarial network and/or a variational autoencoder.

12. The method of claim 1, wherein the generative AI model is configured to execute a diffusion model and/or a large language model to generate the at least one synthetic on-person screening image.

13. A method for training a machine learning algorithm for threat and/or posture detection in on-person screening images, comprising the steps of:

generating at least one synthetic on-person screening image using the method of claim 1;

feeding the at least one synthetic on-person screening image to the machine learning algorithm; and training a threat and/or posture detection by the machine learning algorithm with the at least one synthetic on-person screening image.

14. A system for generating synthetic on-person screening images, comprising:

a database of labeled on-person screening images, wherein a labeling of a respective on-person screening image in the database indicates:

the presence of an object in the on-person screening image, and, in case the object is present, at least one of: a classification of the object, a location of the object, a size of the object, a material of the object and a weight of the object;

a generative artificial intelligence, AI, model; wherein, during a training routine, the generative AI model is configured to receive at least some of the labeled on-person screening images from the database;

an input interface configured to receive an input which comprises:

anatomic information of a person, information on a presence of at least one further object, wherein the at least one further object is external to the person, and information on a location of the further object relative to the person;

wherein the generative AI model is configured to generate at least one synthetic on-person screening image based on the input, wherein the input comprises a script which comprises instructions for generating a plurality of synthetic on-person screening images for the at least one further object in different locations, orientations, shapes and/or sizes.

15. The system of claim 14, wherein the input interface comprises a user interface and/or a communication interface.

* * * * *